United States Patent [19]

Sneed, Jr. et al.

[11] Patent Number: 5,717,749
[45] Date of Patent: Feb. 10, 1998

[54] MEANS AND METHOD FOR PROVIDING LOCAL TELEPHONE NUMBER PORTABILITY

[75] Inventors: Elbert Lee Sneed, Jr., Wheaton; Dorothy V. Stanley, Warrenville, both of Ill.

[73] Assignee: Lucent Technologies Inc., Murray Hill, N.J.

[21] Appl. No.: 742,175

[22] Filed: Nov. 4, 1996

Related U.S. Application Data

[63] Continuation of Ser. No. 329,595, Oct. 26, 1994, abandoned.
[51] Int. Cl.⁶ .................................................. H04M 3/42
[52] U.S. Cl. .......................... 379/207; 379/111; 379/219
[58] Field of Search .................................. 379/111, 112, 379/115, 201, 207, 210, 213, 219, 220

[56] References Cited

U.S. PATENT DOCUMENTS

| | | | |
|---|---|---|---|
| 4,186,438 | 1/1980 | Benson et al. | 364/200 |
| 4,191,860 | 3/1980 | Weber | 379/115 |
| 4,447,676 | 5/1984 | Harris et al. | 379/199 |
| 4,611,096 | 9/1986 | Asmuth et al. | 379/207 |
| 4,757,267 | 7/1988 | Riskin | 379/113 |
| 4,899,373 | 2/1990 | Lee et al. | 379/207 |
| 4,924,510 | 5/1990 | Le | 379/221 |
| 5,136,636 | 8/1992 | Wegrzynowicz | 379/207 |
| 5,237,604 | 8/1993 | Ryan | 379/220 |
| 5,386,467 | 1/1995 | Ahmad | 379/220 |
| 5,394,463 | 2/1995 | Fischell et al. | 379/201 |
| 5,418,844 | 5/1995 | Morrisey et al. | 379/207 |
| 5,434,914 | 7/1995 | Fraser | 379/219 |
| 5,440,541 | 8/1995 | Iida et al. | 379/207 X |
| 5,481,603 | 1/1996 | Gutierrez et al. | 379/221 |

*Primary Examiner*—Krista Zele
*Assistant Examiner*—Scott L. Weaver

[57] ABSTRACT

The invention provides the capability for creating local number portability, enabling a telephone service subscriber to retain a phone number when the local switch servicing the subscriber changes. A database acts as a centralized source of call connection information. Two tiers of databases are used; local databases dedicated to local switches are first queried for call connection information matching the dialed number, and a centralized database serving all switches is subsequently queried if local database response is not sufficient for call placement. Each dialed number is correlated to a call connection a information set containing augmenting information to provide the equivalent of the actual service number for the subscriber for call placement. Call connection information sets are dynamically maintained and updated between the centralized database and the local databases.

4 Claims, 3 Drawing Sheets

MEANS AND METHOD FOR PROVIDING LOCAL TELEPHONE NUMBER PORTABILITY

This application is a continuation of application of Ser. No. 08/329,595 filed Oct. 26, 1994, now abandoned.

FIELD OF THE INVENTION

This invention relates to a means and method for maintaining a telephone service subscriber's phone number notwithstanding a change in the local service provider or a change in the subscriber's location.

BACKGROUND OF THE INVENTION

Problem

Today, each telephone service subscriber's telephone number is associated with a specific geographically resident local telecommunications service provider and that provider's local switch. Each subscriber's unique telephone service number consists of a three digit area code, called an "NPA" number; a three digit local switch prefix, called the "NXX" number, and the subscriber's own four digit number, called the "XXXX" number. The "NXX" number is associated with the particular local switch that maintains the number. With conventional telephone systems, the three digit "NXX" number identifies a specific, unique local switch managed by a single local telephone service provider. Because the NXX number identifies a specific switch to the telephone network, any change in the subscriber's local service provider or relocation of the subscriber to a geographic location outside the service area of the local switch mandates the assignment of a new number within the telephone system for the subscriber's telephone service. Although the area code may be unchanged and the same 4-digit subscriber identifier may be available, the change in the switch then serving the subscriber will result in a different telephone service number for the subscriber because the telephone network requires that the service number properly reflect the identifying NXX number of the servicing switch.

In a conventional telephone network, each local switch contains a switch resident database (SRDB) which contains call connection information, including the area code NPA numbers and the servicing switch NXX numbers assigned throughout the country, to allow the switch responsible for initiating a call to properly direct a call across the telephone network, through intermediate nodes and channels, to the correct area code within the system, then to the correct switch servicing the destination subscriber. In a conventional telecommunications system, this information is permanent, requiring the intervention of a telephone employee to change the information in the SRDB.

The limitation imposed by assigning a unique NXX number to each switch within the geographic confines of the area code is that any change from the local switch originally assigned to service a caller's telephone, for instance, when the caller decides to obtain service through another local carrier or when the caller moves to a location not serviced by the original switch, necessitates the use of the NXX number of the local switch then providing service as part of the telephone number of the subscriber. Only with the new, correct NXX number corresponding to the switch servicing the destination subscriber can an initiating switch properly route a call across the telecommunications network to the desired subscriber.

There is therefore a need for a means and method that supports local number portability.

Solution

This shortcoming of conventional telecommunications networks is overcome in the present invention by including in the network an Intelligent Network Database ("IN Database") which contains correct call connection information, including both a "virtual" service number and augmenting information for each subscriber. My invention is implementable with existing technology and equipment and takes advantage of current network architectures.

Virtual Number is that Recognized among Callers

The virtual service number is the number dialed by a caller to reach an intended destination subscriber and the directory number listed for that subscriber.

Augmented Number is that Recognized by the Telecommunications System

Conversely, the augmented service number is the series of digits which the telecommunications network recognizes as valid call connection information and which is the equivalent of the true NPA, NXX and XXXX designations, from the telecommunications network's perspective, of the intended destination subscriber.

Correlation by the IN Database

The virtual service number need not contain the true NXX number of the servicing local switch of the recipient, or for that matter the true NPA and XXXX designations, because the IN DataBase recognizes each dialed number as a virtual number and supplies in response the proper, corresponding augmenting information for call connection. The IN Database indexes the virtual service number to the augmenting information, and as part of the call connection information provided to a switch initiating a call and querying the IN Database, would respond to the query by providing the augmenting call connection information, i.e., the identification of the terminal carrier and terminating switch, to which the virtual number then corresponds. In addition to the identification of the terminal carrier and the terminating switch, call connection information may include other information, such as applicable rate information or available features. The collection of all information correlated to a virtual service number is subsequently referred to as a call connection information set.

A similar approach exists with 800 numbers as discussed in U.S. Pat. No. 4,924,510. An industry-wide database contains 800-prefixed number which provides an unlisted telephone number to the toll switch to route the call because of the absence of a proper area code.

A major drawback to utilization of a centralized database, and which is solved by the present invention, is that for any call initiated, the originating switch does not possess call connection information for the destination of the call termination, particularly the augmented service number of the desired destination corresponding to the virtual service number dialed by the initiating caller, and hence is incapable of independently processing the call request. Consequently, the centralized database is queried each time a switch originates a call.

If local number portability was attempted to be implemented with the IN Database as the sole repository and centralized source of call connection information for the telecommunications network, each originating switch for every serviced call would first query the IN database which would then search its stored call connection information sets for the appropriate match and respond accordingly to the querying switch. This regime would result in additional call processing time, known as "post-dial delay" of an additional and unacceptable 5 to 15% real time delay from the time the initiating caller dials the phone number to the time the caller hears the destination phone ring.

The above problems are solved and an advance is made over the prior art in accordance with my invention wherein a dynamic switch resident database (SRDB), which may not be physically part of a local switch but merely dedicated to servicing that switch, is included for switches in the network.

While ideally each switch in the system would have a dedicated SRDB, this is not essential to my invention nor to gain benefit from my invention. Each switch having a dedicated SRDB reduces line traffic—queries and responses—and post-dial delay. The greater the number of switch dedicated SRDB's implemented in the system, potentially the more responsive the system becomes by reducing post-dial delay. Each SRDB, like the IN Database, is comprised of a central processing unit and memory structured by software to correlate the data input to a database created in the memory to dialed numbers and to search and recover that correlated data when queried with a dialed number by the served switch. The distinguishing feature of the SRDB from the IN Database, is that unlike the IN Database the SRDB does not store all system service numbers and associated call connection information sets, but only a portion of them most likely to be dialed through the switch. The portion stored are hierarchically ranked based upon, among other considerations, the destination numbers most often and most recently called from the served originating switch. Individual SRDB's can have widely diverse storage capacities depending upon the user population or the volume of calls initiated. The quantity of call connection information sets which each SRDB may contain is nonetheless purposely limited. This is done to avoid providing such a large number of call connection information sets that the time required to search the database memory results in an unacceptable post-dial delay. The SRDB drops from storage those numbers and correlated call connection information sets which do not meet the hierarchical determinants to remain resident on the SRDB. The consequence of utilizing an SRDB which dynamically rolls stored service number information is two-fold. Dealing with fewer service numbers reduces post-dial delay. Storing information for most current and most often called service numbers increases the likelihood that the SRDB will contain the desired service number which also contributes to a reduction in post-dial delay. However, it is recognized by the instant invention that the SRDB will not always store the correlated call connection information set for a particular dialed service number.

In instances when the dedicated SRDB does not contain the queried destination number, in the instant invention, the originating switch launches a query to the IN Database as the repository of all subscriber service numbers, both virtual and augmented, which then provides the appropriate call connection information set to the switch initiating the query to permit the call to be completed. Contemporaneously, the SRDB is updated by the switch without telephone employee intervention, this dynamic updating capability a further feature of the instant invention.

At the outset, the SRDB may be empty or contain a predetermined allocation of subscriber call connection information sets. Upon call initiation, the originating local switch first queries the SRDB for the presence of the virtual service number and corresponding call connection information. If the SRDB does not contain the virtual service number, the originating switch then queries the IN Database and receives the correlated call connection information from which the switch produces the augmented service number. When a switch queries the IN database, the SRDB is provided and may store the call connection information set depending upon its rank relative to other call connection information sets then available to the SRDB and the SRDB's storage capacity. Assuming a call connection information set accepted for storage by the SRDB is not subsequently purged, as described in the subsequent paragraph, the call connection information set will be available to the switch from its dedicated SRDB the next time the virtual service number is dialed.

This querying of the IN Database for numbers and storage in the SRDB by the local originating switch continues until the SRDB reaches its limit for stored call connection information sets. This limit can be either arbitrarily set or determined based upon available memory capacity, but at the time the limit is reached the SRDB ranks calls originated from the served switch by most often called and most recently called. The next call or calls placed can then trigger the SRDB to purge from storage a sufficient number of call connection information sets to permit storage of call connection information sets displacing numbers called less frequently or less recently. This hierarchical ranking and displacement continues dynamically for all subsequent calls originating through the switch.

By keeping call connection information sets for most recent and most often used numbers in the SRDB dedicated to the local switch, the number of queries to the IN database is reduced. Because the SRDB can respond more quickly to queries not having to be sent over the telephone network, and because switch query servicing by dedicated SRDBs reduces query traffic to the IN Database, the post-dial delay experienced by the initiating caller is reduced.

In accordance with one aspect of my invention, a telecommunications system is provided with at least one centralized database which stores call connection information regarding telephone service numbers.

In accordance with another aspect of my invention, the call connection information stored by the centralized database includes the virtual telephone number of a subscriber, that is, the number known by the subscriber as his/her number, and sufficient call connection information, notably the identification of the terminating carrier and the terminating switch, to produce the augmented telephone number of the subscriber, that is, the number recognized by the telecommunications system as the destination location for the call placed although the number dialed by a caller, the virtual telephone number, differs.

In accordance with a further aspect of my invention, a local switch responsible for originating and routing calls initiated by subscribers assigned to that switch has associated with it a dedicated database which the switch accesses for call connection information.

In accordance with a still further aspect of my invention, each dedicated database contains for certain telephone service numbers call connection information supplied from the telephone system centralized database.

In accordance with another further aspect of my invention, each dedicated database stores no more than a finite number of telephone service numbers and the associated call connection information, and then only the most recently called and/or most often called numbers according to a desired hierarchy, replacing numbers and information relevant to calls which descend the hierarchical ladder with those ascending the hierarchical ladder.

In accordance with a still further aspect of my invention, a local switch serviced by a dedicated local database will first query the local database for call connection information relating to each initiated call and will only query the centralized system database when the dedicated local database does not respond with the number within an acceptable time frame.

In accordance with another additional aspect of my invention, the call connection information provided by either the centralized system database or the local dedicated database to a switch includes both the virtual and augmenting call connection information for the destination recipient.

In accordance with still another additional aspect of my invention, a telephone service subscriber is able to select or keep a telephone service number by the telephone system providing means for a correlation from the number used by the subscriber to the number recognized by the telephone system as the termination destination for that subscriber.

DETAILED DESCRIPTION

Figure 1:
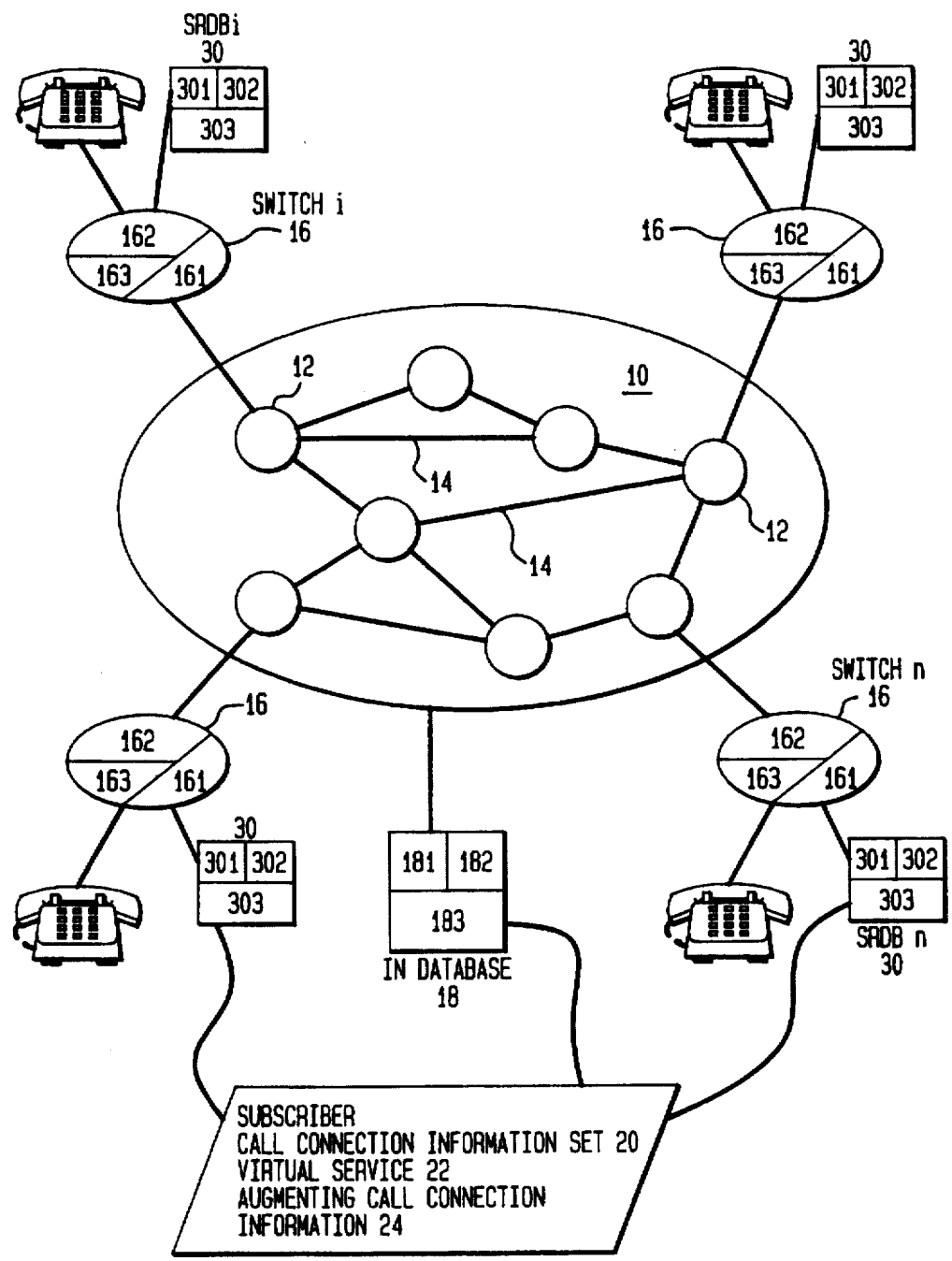
FIG. 1 illustrates a block diagram of the local number portability architecture.

FIG. 1 is a diagram illustrating the architecture of a telecommunications system network 10 having local number portability. Network 10 is comprised of interconnected nodes 12, channels 14, and local area switches 16. In the context of this invention, switches are stored program electronic switches such as the 5ESS available from AT&T Network Systems, 475 South Street, Morristown, N.J. Each switch 16 is comprised of a central processing unit (CPU) 161, memory 162 and software 163 which manages the switch through CPU 161 interacting with memory 162. The embodiment presented in FIG. 1 incorporates into network 10 a single centralized system database, known as an Intelligent Network Database (IN Database) 18 comprised of a central processing unit (CPU) 181, memory 182, and software 183 which manages the IN Database through CPU 181 interacting with memory 182. An A-I-Net Service Control Point available from AT&T Network Systems, 474 South Street, Morristown, N.J. is a suitable processor for this application, depending upon memory requirements. Other embodiments may use more than one CPU/memory/software unit making up the IN Database 18, splitting the function of the IN Database over the units or co-processing queries and information among the units. The IN Database 18 stores all current subscriber call connection information, including the subscriber's virtual service number 22, that is, the number listed in telephone directories for the subscriber and which is the number dialed by a caller attempting to reach the subscriber, and augmenting call connection information such as the identification of the terminating carrier and the terminating switch to produce the equivalent of the subscriber's actual service number, if different from the virtual service number. The augmented service number 24 is the number recognized by equipment within Network 10 in routing calls to the subscriber's destination. Other call connection information may include trunk and switch routing information relevant to call processing and connection, billing rates and special features identification. The augmented service number 24 can, but need not be, the same as the virtual service number 22 for a specific subscriber. Likewise, augmenting call connection information may include a complete NPA-NXX-XXXX number which replaces the virtual service number, and, as such, is the actual service number for the destination subscriber. All call connection information relevant to a specific virtual service number 22 is considered a call connection information set 20.

Local area switches 16, designated as switches i-n in FIG. 1, are connected across network 10 to IN Database 18.

Another feature of the instant invention is the presence of a dedicated local database known as a Switch Resident Database i-n (SRDB) 30 which interfaces with its assigned switch i-n 16. Each SRDB is comprised of a central processing unit 301, a memory 302 and software 303 which provides functionality to the switch and places data in and extracts data from memory, data including call connection information sets 20. An A-I-Net Service Control Point available from AT&T Network Systems, 475 South Street, Morristown, N.J. is an acceptable processor for use in the SRDB application, depending upon memory requirements.

While in the preferred embodiment a single SRDB 30 is dedicated to a single switch 16, more than one SRDB 30 could serve a single switch 16, and a single SRDB 30 could serve more than a single switch 16. Further, an SRDB 30 need not be a physically separate unit from the switch 16, but may simply be part of the functioning of the switch's CPU 161 and managing software 163 with the stored call connection information sets 20 occupying a portion of memory 163 within CPU 161.

Figure 2A:
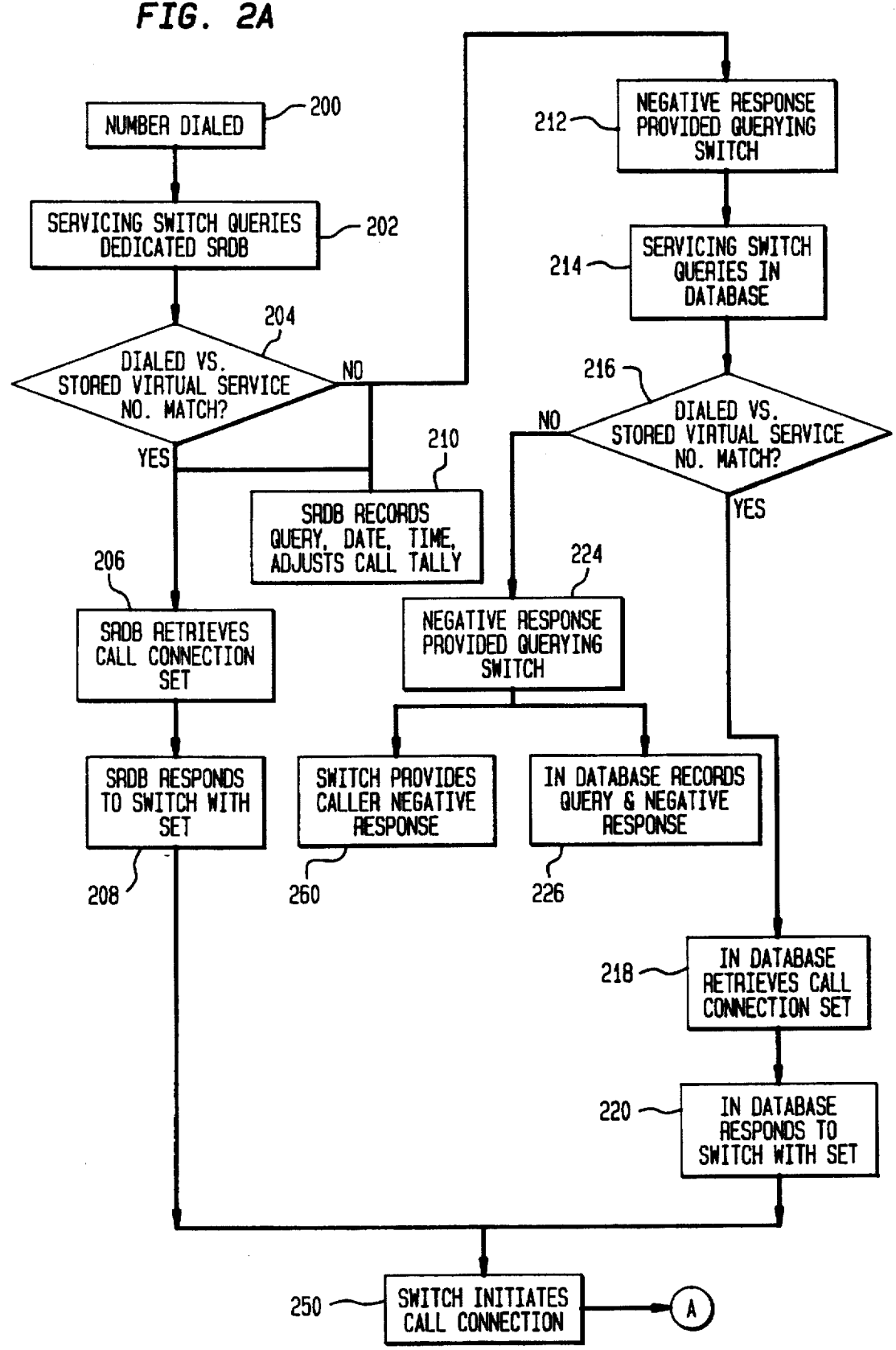
FIGS. 2A and 2B illustrate a flow diagram of the local number portability method.
Figure 2B:
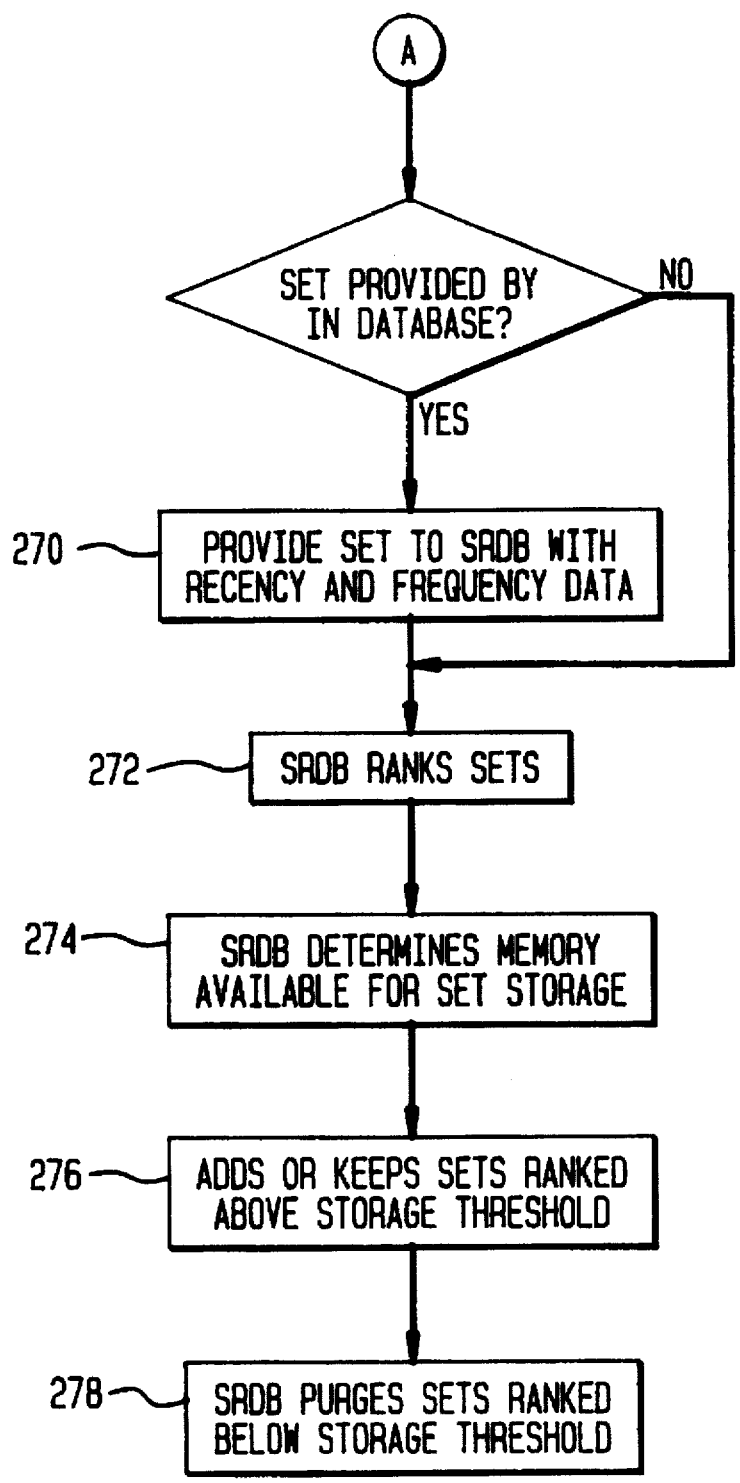

Turning to FIG. 2, the method of operation of the instant invention is illustrated. Each time a number is dialed by a caller 200, the servicing switch n takes the dialed service number and queries 202 its dedicated SRDB which, in turn, searches 204 virtual service numbers stored in its memory and, if a match is found to the dialed service number, the SRDB retrieves 206 the corresponding call connection information set, and provides 208 the augmented service number and other appropriate call connection information to the switch. Contemporaneously, the SRDB records the date and time of the query against the virtual service number and adds one to the tally of times 210 the SRDB was queried for that particular service number. If the SRDB does not contain the dialed service number among its stored virtual service numbers, the SRDB provides a negative response 212 to the switch.

Upon receipt of a negative response from the SRDB, the querying switch next queries 214 IN Database regarding the dialed service number. Much like the SRDB, the IN Database, in turn, searches 216 its stored virtual numbers for a match and, if one is found, retrieves 218 the corresponding call connection information set, including the augmenting connection information, and provides it 220 to the switch. The IN Database contemporaneously records 222 the identity of the querying switch and the date and time of the query. If the IN Database contains no stored record of the queried service number, a negative response is provided 224 to the querying switch and the IN Database also records 226 the query and negative response in a problem report file.

Upon receipt of the response from the IN Database 18, the switch 16 either commences call connection 250 across the network 10 through use of the identified actual service number and related call connection information included in the subscriber call connection information set provided, if the response is positive, or provides the caller 260 with a negative response message, if the response is negative.

The switch then offers 270 the call connection information set received from IN Database to the SRDB. This information would include the number of times the switch has queried the IN Database for the particular number and when those queries occurred. The SRDB then makes a determination whether to add that particular subscriber call connection information set as one of its stored numbers or to discard the number. This determination by the SRDB is based upon the available storage remaining in the SRDB at the time the number's set is offered 274 and whether the number's corresponding frequency and recentness of request as a call destination from the switch, when compared to the hierarchical ordering of other numbers then stored places the new number in a position sufficiently superior to at least one other number then stored by the SRDB to replace that number's set with the new number's set 276, discarding 278 the old number's set if it can no longer remain in available storage based on its comparative rank against all other sets.

Returning to FIG. 1, the dedicated SRDB's 30 in conjunction with the IN Database 18 provides in the network 10 the ability to allow local number portability. Conventional telecommunications switches 16 require the actual telephone number, that is, the NPA-NXX-XXXX numbers recognized by the telecommunications network as the intended subscriber destination, be dialed to reach the intended destination recipient subscriber. A conventional telecommunications network will only direct calls to the switch 16 identified to the network 10 as having the dialed NXX number. The present invention provides a cross-indexing of service number dialed—virtual service number 22—to augmenting call connection information to provide the equivalent of the actual NPA-NXX-XXXX service number for the intended termination subscriber. Rather than recognizing the virtual service number as a valid destination identification, the switch 16 uses the virtual service number 22 along with the augmenting call connection information to develop a utilizable augmented service number 24. Once the switch 16 obtains the augmented service number 24 and other call connection information from the call connection information set 20, it uses this information to properly route the call through the various network elements to the desired destination service location.

Because of the cross indexing capability of the instant invention created by the utilization of the SRDB and IN Database, a subscriber need not maintain the NXX number for the switch serving his/her terminal equipment. A subscriber could originally be assigned a 10 digit number which may correctly reflect the NXX number for the switch servicing the number. Thus, in such a circumstance, the subscriber's virtual and augmented service numbers could be the same. The subscriber might thereafter change either local service providers or serving switch, with the administrator for the new switch simply providing to the IN Database updating information to change the augmenting call connection information from the outdated information to the new augmenting call connection information. This may be the specific NXX number of the new switch or some other data which identifies the correct switch to the system. Thus, even though there is a conversion of dialing instructions internal to the telecommunications network, it is invisible to the subscriber and to the caller who continue to deal with and recognize the virtual service number as the appropriate number for the subscriber. For example, if a subscriber is served by switch i 16, the subscriber's call connection information set is maintained in IN Database 18 and may De stored as well in SRDB n 30, if callers served by switch n have dialed the subscriber's virtual number 22. If the subscriber moves location necessitating a change in local serving switch i, the IN Database 18 is updated. When the subscriber's service number is next called, the IN Database 18 will notify the querying switch 16. The querying switch, in addition to placing the call, then offers the number to its dedicated SRDB 30. As new numbers are added to an SRDB, the oldest, least frequently dialled numbers and their associated call connection information sets 20 are purged from the SRDB. Thus, the IN Network 10 does not have to be queried to complete phone calls.

It is to be understood that the above description is only one of the preferred embodiment of the invention. Numerous other arrangements may be devised by one skilled in the art without departing from the spirit and scope of the invention. The invention is thus limited only as defined in the accompanying claims.

We claim:

1. In a telecommunications system, a two tier database system recognizes a virtual service number for an intended call recipient and provides a corresponding call connection information set for the intended call recipient to the telecommunications system to connect a first telephone at which the virtual service number is dialed by a caller to a port identified by the corresponding call connection information set as a destination location of the intended call recipient, the two tier database system comprising:

a plurality of switches;

a centralized database storing a plurality of call connection information sets existing in the telecommunications system and serving the plurality of switches, the centralized database including:

means to count queries by a particular one of the plurality of switches for the corresponding call connection information set, the count representing the frequency of queries for the corresponding call connection information set, means to record the date and time of each query by the particular switch for the corresponding call connection information set, the date and time representing the recency of queries for the corresponding call connection information set;

a plurality of dedicated database means, each dedicated database means storing a limited number of call connection information sets, and a particular one of the plurality of dedicated database means serving a particular switch of the plurality of switches, wherein the particular switch first queries the particular dedicated database means for the corresponding call connection information set for the dialed virtual service number and the particular switch queries the centralized database for the corresponding call connection information set if the corresponding call connection information set is not present in the particular dedicated database means, whereupon the centralized database provides the corresponding call connection information set to the particular dedicated database means, the particular dedicated database means comprising:

means for dynamically maintaining in storage in the particular dedicated database means a group of call connection information sets most likely to be used by the particular switch by hierarchically ranking call connection information sets in the particular dedicated database means, as well as each call connection information set provided by the centralized database, each time a call connection information set is provided by the centralized database, the ranking based upon both the frequency of queries and the recency of queries for each call connection information set by the particular switch and the dynamically maintaining means deleting from the particular dedicated database means a call connection information set which is either ranking below a desired threshold of recency of queries and frequency of queries or, in the alternative, which is preempted by other call connection information sets having a greater hierarchical ranking.

2. The telecommunications system of claim 1 in which the particular dedicated database means includes > means to record for each call connection information set the group of call connection information sets stored in the particular dedicated database means, information pertaining to the date and time the particular switch queries the particular dedicated database means for the stored call connection information set; and
>
> means to count and record the queries by the particular switch of the particular dedicated database means for the stored call connection information set, whereby, for the stored call connection information set, the recency of queries is determined from the information pertaining to the date and time of the queries by the particular switch and the frequency of queries is determined from the count of the queries by the particular switch, to provide for the hierarchical ranking of the stored call connection information set.

3. A method of providing in a telecommunications system the routing of calls by using a virtual service number correlated to an actual service number for a subscriber, comprising:

> creating for the subscriber a call connection information set correlated to the virtual service number for the subscriber, the call connection information set including augmenting call connection information equivalent to the actual service number for the subscriber;
>
> storing, in a centralized database the call connection information set correlated to the virtual service number as one of all call connection information sets in the telecommunications system stored in the centralized database;
>
> storing a limited number of the call connection information sets in the telecommunication system in a second database;
>
> dialing the virtual service number;
>
> querying the second database for the call connection information set correlated to the virtual service number;
>
> keeping count of the number of queries for the call connection set correlated to the virtual service number, the count representing the frequency of use for the call connection set correlated to the virtual service number;
>
> recording the date and time of each query for the call connection information set correlated to the virtual service number, the date and time representing the recency of use for the call connection set correlated to the virtual service number;
>
> if the call connection information set correlated to the virtual service number is not stored in the second database, providing the call connection information set correlated to the virtual service number from the centralized database to the second database;
>
> when the call connection information set correlated to the virtual service number is provided by the centralized database to the second database, hierarchically ranking the limited number of call connection information sets in the second database, the ranking based upon the frequency of use for each particular call connection information set of the limited number of call connection information sets in the second database represented by the number of queries for each particular call connection information set of the limited number of call connection information sets in the second database, and also based upon the recency of use for each particular call connection information set in the second database represented by the date and time of the queries for each particular call connection information set of the limited number of call connection information sets in the second database; and
>
> deleting from the second database each particular call connection information set ranking lower than a determined threshold criteria based upon the recency of use and the frequency of use for each particular call connection information set or ranking lower than the limited number of the call connection information sets to be stored in the second database;
>
> utilizing the call connection information set correlated to the virtual service number to augment the dialed virtual service number to reach the subscriber.

4. In a telecommunications system having a centralized database and a plurality of switches, each switch of such plurality of switches served by a respective dedicated database, and in which calls are placed by dialing an actual service number for an intended subscriber in the form NPA-NXX-XXXX in which NPA stands for a 3-digit area code of an intended receiving subscriber, NXX stands for a 3-digit identification for the switch serving the intended receiving subscriber, and XXXX stands for a 4-digit personal identification number of the intended receiving subscriber, a method of employing numbers other than the area code NPA number, the serving switch NXX number and the personal identification XXXX number in dialing and successfully connecting with the intended receiving subscriber, comprising the steps of:

> assigning to the actual service number a virtual service number to be dialed in lieu of the actual service number in placing a call to the intended receiving subscriber;
>
> assigning to the virtual service number augmenting call connection information and other call connection information pertaining to the intended receiving subscriber, to properly connect the call to the intended receiving subscriber;
>
> correlating the virtual service number to the augmenting call connection information and other call connection information to define a correlated call connection information set for the intended receiving subscriber;
>
> storing the correlated call connection information set in the centralized database,;
>
> dialing the virtual service number;
>
> having the particular switch first receiving the dialed virtual service number query the dedicated database for the particular switch for the correlated call connection information set for the dialed virtual service number;
>
> providing the correlated call connection information set from the centralized database to the dedicated database for the particular switch if the dedicated database for the particular switch does not contain the correlated call connection information set at the time of the query from the particular switch;
>
> the particular switch receiving the correlated call connection information set properly connecting the call to the intended receiving subscriber;
>
> counting and storing the number of queries by the particular switch for the correlated call connection information set, the number of queries representing the frequency of query for the correlated call connection information set;
>
> recording the date and time the particular switch queries the dedicated database for the particular switch for the correlated call connection information set, the date and time representing the recency of query for the correlated call connection information set;

dynamically ranking the correlated call connection information set against at least one other call connection information set stored in the dedicated database for the particular switch according to a desired hierarchical method which takes into consideration the recency of query and the frequency of query by the particular switch for the correlated call connection information set;

storing the correlated call connection information set in the dedicated database for the particular switch if the ranking of the correlated call connection information set is higher than the ranking of the at least one other call connection information set stored in the dedicated database for the particular switch.

* * * * *